United States Patent
Joseph et al.

(10) Patent No.: US 11,889,841 B2
(45) Date of Patent: Feb. 6, 2024

(54) PROCESS FOR PRODUCING LOW GLUTEN OR GLUTEN FREE DOUGH

(71) Applicant: PHYTOBOKAZ, Gourbeyre (FR)

(72) Inventors: Henry Joseph, Gourbeyre (FR); Patricia Le Bail, Nantes (FR); Alain Le Bail, Nantes (FR)

(73) Assignee: PHYTOBOKAZ, Gourbeyre (FR)

( * ) Notice: Subject to any disclaimer, the term of this patent is extended or adjusted under 35 U.S.C. 154(b) by 715 days.

(21) Appl. No.: 16/975,048

(22) PCT Filed: Feb. 22, 2019

(86) PCT No.: PCT/FR2019/000021
§ 371 (c)(1),
(2) Date: Jan. 9, 2021

(87) PCT Pub. No.: WO2019/162579
PCT Pub. Date: Aug. 29, 2019

(65) Prior Publication Data
US 2021/0219560 A1    Jul. 22, 2021

(30) Foreign Application Priority Data

Feb. 22, 2018 (FR) ..................................... 18 51564

(51) Int. Cl.
| A21D 13/066 | (2017.01) |
| A21D 8/02 | (2006.01) |
| A21D 2/18 | (2006.01) |
| A21D 8/04 | (2006.01) |
| A21D 10/02 | (2006.01) |

(52) U.S. Cl.
CPC ........... *A21D 13/066* (2013.01); *A21D 2/183* (2013.01); *A21D 8/025* (2013.01); *A21D 8/047* (2013.01); *A21D 10/02* (2013.01)

(58) Field of Classification Search
None
See application file for complete search history.

(56) References Cited

U.S. PATENT DOCUMENTS 6,207,214 B1    3/2001    Kim

FOREIGN PATENT DOCUMENTS

| CA | 3004382 A1 | 5/2017 |
| FR | 2831023 A1 | 4/2003 |
| FR | 2842991 A1 | 2/2004 |
| FR | 3029742 A1 | 6/2016 |

OTHER PUBLICATIONS

Dana Elgeti et al, "Strategies for the aeration of gluten-free bread—A review", Trends in Food Science and Technology, vol. 46, No. 1, 2015, p. 75-84, XP055326605 DOI: 10.1016/j.tifs.2015.07.010 external link ISSN:0924-2244 point 3.3; p. 77, p. 78, left-hand column, paragraph 1.

Renata Rozylo et al, "Physical properties of gluten-free bread caused by water addition", International Agrophysics, vol. 29, No. 3, 2015, p. 353-364, XP055505813 DOI: 10.1515/intag-2015-0042 external link from Results and Discussion; pp. 355-363.

*Primary Examiner* — Lien T Tran
(74) *Attorney, Agent, or Firm* — Craft Chu PLLC; Andrew W. Chu (57) ABSTRACT

The process for producing low-gluten or gluten-free cooking dough for food purposes includes making a dough composition including, by weight relative to the total percentage by weight thereof: between 88.5 and 95% of dittany starch, between 0.1 and 0.5% of salt, between 40 and 65% of water, yeasts, between 3 and 5% of sugar, between 1.5 and 4% of pea protein, and between 0.2 and 3.6% of at least one thickener. The dough composition is kneaded in a closed chamber depressurized beforehand. Carbon dioxide $CO_2$ is injected into the chamber at a pressure of between 25 and 550 mbar for 10 to 50 minutes simultaneously to the kneading step, so as to obtain a low-gluten or gluten-free cooking dough.

5 Claims, 5 Drawing Sheets

PROCESS FOR PRODUCING LOW GLUTEN OR GLUTEN FREE DOUGH

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of the preparation of food-quality gluten-free or low-gluten baking dough, in particular yeast doughs. Said food-quality baking doughs can be used in bakery, they are for example baking doughs permitting the manufacture of gluten-free bread or other Viennese pastries, cakes, pizzas.

2. Description of Related Art Including Information Disclosed Under 37 CFR 1.97 and 37 CFR 1.98

In the field of food, gluten is recognized as an allergen. In addition, gluten intolerance can cause ailments in some patients, such as those with celiac disease. The latter may have digestive problems linked to gluten intolerance. In addition, the manufacturing of gluten-free food is increasingly sought after in dietetics or for reasons of well-being and health.

The preparation of food-quality gluten-free or low-gluten baking dough has the drawback of largely modifying the physical properties and organoleptic qualities of the dough both before and after it is baking. In other words, food products made from gluten-free or low-gluten baking dough, such as bread, cakes or Viennese pastries, may therefore also have their physical properties and organoleptic qualities altered. Indeed, gluten is a protein material comprised of two proteins, gliadin and glutenin. The latter provide the flour with its viscoelastic properties. Gliadins provide the food-quality dough with its expandability, its viscosity and its plasticity.

It is therefore important in the preparation of a food-quality gluten-free or low-gluten baking dough to be able to at least partially restore the physical properties of the food-quality baking dough, while maintaining its organoleptic qualities.

The inventor has already provided, in patent FR 3 029 742 B1, a gluten-free culinary composition for the preparation of a yeast dough. Said gluten-free culinary composition comprising at least dictame starch as gluten-free or low-gluten flour, salt, pea protein as homogenizing agent, sugar and at least one thickening agent. In order to prepare the food-quality baking dough, yeast, water and fat are added to the aforementioned gluten-free baking composition, followed by mixing until a food-quality baking dough is obtained. Thus, in patent FR 3,029,742, by playing on the intrinsic composition of said gluten-free culinary composition one seeks to find the physical properties and the organoleptic qualities of the food-quality baking dough. The latter will then, after rising and baking, provide a gluten-free food product, the latter having qualities comparable to a food product obtained from a food composition with gluten.

In other words, in the prior art the baking dough obtained had to be conventionally left to rise for fermentation for a period of time between 25 minutes and one hour at a temperature between 25 and 35° C., this before being placed in the oven for baking.

In the preparation of gluten-free baking dough, patent FR 3 029 742, in order to play on the physicochemical qualities and physical properties of the final gluten-free food obtained from the gluten-free baking dough, provides to modify the basic intrinsic culinary composition.

However, a modification of the manufacturing parameters of the gluten-free baking dough also consists of a means for improving the final physicochemical properties that one wishes to obtain in the gluten-free food.

With the aim of improving the physicochemical and organoleptic quality of conventional gluten-containing bread, it is known to perform a kneading under negative pressure, then an injection of a gas at atmospheric or sub-atmospheric pressure, generally comprising oxygen. However, solutions of kneading under pressure adapted to baking doughs providing gluten-free or low-gluten bread with their specific properties have not been provided.

Indeed, for a gluten-free yeast baking dough; prepared from gluten-free or low-gluten culinary compositions, not having the same physicochemical characteristics as a food dough resulting from a culinary composition with gluten, the solution of injecting an atmospheric gas with oxygen when kneading the dough is not suitable.

It is therefore necessary to find a suitable solution for the preparation of a food-quality baking dough, for manufacturing a gluten-free food, which has organoleptic and physicochemical properties similar to those of a food product with gluten.

BRIEF SUMMARY OF THE INVENTION

One of the aims of the present invention is to have a gluten-free food, such as bread, having a long shelf life without hardening and becoming stale too quickly.

To this end, solutions for improving the preservation have been provided for conventional bread doughs using preserving improvers such as carboxymethylcelluloses (CMC).

This type of preserving agent involves making a baking dough from a culinary composition using ingredients that can modify the taste of the final food being obtained. The presence of these preserving agents in these products is considered as chemical by the consumers and should therefore be avoided as much as possible.

A first aim of the present invention is to provide a method and a system for preparing food-quality gluten-free or low-gluten baking dough, the physical properties of which remain comparable to those of food-quality baking dough, such as conventional bread dough.

A second aim is to provide a method and a pressure variation system, which are particularly suitable for a gluten-free or low-gluten dough.

A third aim is to provide a gluten-free or low-gluten bread having a long shelf life without the addition of improving agents such as CMC.

To this end, a method is provided for manufacturing food-quality gluten-free or low-gluten baking dough from a dough composition comprising gluten-free or low-gluten flour, water, yeasts, at least one homogenizing agent, and at least one thickening agent, in which:

said dough composition is kneaded in a closed chamber, wherein $CO_2$ is injected into said chamber simultaneously with the kneading step, so as to obtain a gluten-free or low-gluten baking dough with a porosity higher than 17%.

Advantageously, the method according to the invention permits to increase the porosity of said food-quality baking dough obtained from a substantially liquid dough composition recalling in particular the texture of a chocolate mousse. These aspects permit to have a dough composition that is easier to be kneaded, fora dough that is easier to be baked compared to, for example, a substantially solid dough composition permitting the manufacture of a food-quality baking dough.

In addition, the inventors have surprisingly observed that the baking dough obtained with the method according to the invention could advantageously be placed in the oven quickly after kneading, which permits to avoid a fermentation time and therefore to limit costs while increasing productivity.

Indeed, taking into consideration the intrinsic formulation of the gluten-free dough composition and the particular steps of the method for manufacturing the corresponding baking dough; the physicochemical properties of the baking dough being obtained, in particular its porosity, permit to omit the rising time for fermentation usually required before baking.

Furthermore, with the method according to the invention, in the case of the manufacture of a food-quality baking dough intended for the preparation of a bread, the bread being obtained has a shelf life of 4 to 6 days with a cohesive crumb without the need to add chemical enhancers such as CMC.

This aspect shows a significant improvement in quality by providing a gluten-free or low-gluten bread having a long shelf life without hardening and becoming stale too quickly.

According to further aspects taken alone or combined in all technically feasible combinations:
the chamber is temperature-controlled at 30° C.; and/or
the step of kneading under $CO_2$ is carried out for 10 to 50 minutes; and/or
the dough composition comprises between 40 and 65 weight % water and between 29 and 52 weight % gluten-free or low-gluten flour; and/or
the kneading is carried out so as to obtain a dough with a porosity between 20 and 30%; and/or
the porosity of the dough is monitored; and/or
kneading is stopped when the pH of said dough is stabilized between 5 and 5.4, and/or when the porosity of said dough is between 28 and 32%; and/or
the pH of said dough is measured during kneading; and/or
the $CO_2$ pressure is between 25 and 550 mbar; and/or
the gluten-free or low-gluten flour comprises at least one maranta, rice, *quinoa*, breadfruit, manioc, yam and/or buckwheat flour; and/or
said homogenizing agent comprises pea protein and/or tropical bean protein (lablab); and/or
said thickening agent comprises xanthan, guar and carob bean gum, and/or carrageenans.

The invention further relates to a gluten-free or low-gluten baking dough obtained at the end of a method according to the invention, the dough comprising gluten-free or low-gluten flour, a homogenizing agent, water, yeasts and at least one thickening agent, kneaded by injecting $CO_2$, wherein it has a porosity higher than 17% and comprises between 40 and 65 weight % water for between 29 and 52 weight % gluten-free or low-gluten flour.

Another object of the invention relates to a system for manufacturing gluten-free or low-gluten baking dough comprising a kneader with a chamber that can be pressurized associated with a source of $CO_2$, characterized by a means for measuring the porosity and a means for measuring the pH.

Preferably, the system comprises a baking dough according to the invention.

The invention furthermore relates to a method for manufacturing a gluten-free or low-gluten product, in particular gluten-free or low-gluten bread, wherein, after the steps of the method for manufacturing the dough according to the invention:

said gluten-free or poor baking dough is baked with a porosity higher than or equal to about 30%, for 30 to 60 minutes, at a temperature between 170 and 240° C.

According to one variant, the dough is baked directly after kneading.

BRIEF DESCRIPTION OF THE SEVERAL VIEWS OF THE DRAWINGS

The invention will be explained in more detail by the description of non-restrictive embodiments and based on the appended figures.

DETAILED DESCRIPTION OF THE INVENTION

For more clarity in the figures is now explained the meaning of the reference codes of the figures for food-quality baking doughs obtained by implementing the manufacturing method according to the invention or a slightly modified method:
- PAC30: modified method according to the invention, where air at 30 mbar is injected as a replacement for CO2 during kneading;
- PAC500: modified method according to the invention, where air at 500 mbar is injected as a replacement for CO2 during kneading;
- POD500: method according to the invention with injection of CO2 at 500 mbar during kneading;
- POD510: method according to the invention with injection of CO2 at 500 mbar during kneading and a 10% reduction of dry matter;
- POD520: method according to the invention with injection of CO2 at 500 mbar during kneading and a 20% reduction of dry matter;
- POD530: method according to the invention with injection of CO2 at 500 mbar during kneading and a 30% reduction of dry matter;
- POD540: method according to the invention with injection of CO2 at 500 mbar during kneading and a 40% reduction of dry matter.

By the term "reduction of dry matter" is understood the fact of increasing the quantity of CO2 injected during kneading in the implementation of the method for manufacturing POD510, POD520, POD530 and POD540, compared to the quantity of CO2 injected during kneading for the reference sample POD500.

Indeed, the increase of the amount of CO2 during kneading permits to reduce the percentage of dry matter of the baking dough compared to its total weight percent. Thus, by modifying the quantity of CO2 injected during kneading, the percentage of dry matter is reduced by 10, 20, 30 or 40% of the baking dough obtained at the end of the method, compared to the percentage of dry matter of the baking dough obtained for the sample POD500.

The present invention relates to a method for manufacturing a gluten-free or low-gluten baking dough, such as in particular a gluten-free or low-gluten bread dough, or a dough for pastry or Viennese pastry.

The manufacturing method comprises a step in which baking dough ingredients are mixed in order to form said dough. We can also speak of "dough composition" to describe the product obtained after the mixing of the ingredients forming, after kneading and injection of CO2 into, said baking dough.

In particular, the mixture, i.e. said dough composition, is kneaded under a pressure between 25 and 550 mbar of CO2 in a manner as described in detail hereinafter. More particularly, a vacuum pump is first of all applied to the kneader before the injection of CO2, so as to first depressurize the closed chamber containing said dough composition before kneading. The baking dough, obtained at the end of the kneading step simultaneously with the injection of CO2, can be baked, in particular placed in the oven, to obtain the product to be consumed, for example gluten-free bread.

The dough composition being used has a particular composition. The ingredients comprise at least gluten-free or low-gluten flour, in particular such as dictame starch, water, yeasts, at least one homogenizing agent, and at least one thickening agent. The homogenizing agent and the thickening agent are intended to provide the baking dough with particular physicochemical mechanical properties, in particular to compensate for the absence of gluten.

According to one aspect of the invention, the composition comprises between 40 and 65 weight % water and between 29 and 52 weight % gluten-free or low-gluten flour. These proportions associated with a kneading under pressure of CO2 permit to have a final product such as baking dough of a large volume for a lower rate of gluten-free or low-gluten flour.

Preferably, the baking dough composition comprises substantially as much water as gluten-free or low-gluten flour, by weight.

The gluten-free or low-gluten flour can be or include a maranta flour. It is in particular *Maranta arundinacea* L. We can also speak of flour or starch. Alternatively or in combination, the gluten-free or low-gluten flour may be or comprise at least one rice, quinoa, breadfruit, manioc, yam and/or buckwheat flour. These flours permit to produce gluten-free or low-gluten final food products, i.e. products in which gluten is present in traces. The absence or low level of gluten in this kind of food product significantly limits ailments, allergies and intolerances in consumers, and meets a demand for healthier products.

The homogenizing agent permits to improve the homogenization of the kneaded dough, in the absence of gluten, in particular for the internal part of the baked product. In the case of bread or other pastry or Viennese pastry, the homogenizing agent within said dough composition permits to make the crumb of the bread, obtained after baking the baking dough, more homogeneous. More particularly, it permits to homogenize the size of the cells of the product obtained after baking. Furthermore, it provides the crust with a special browning. The homogenizing agent can be or comprise pea protein and/or tropical bean protein (namely such as *Lablab*). These proteins have good protein yields per seed. Pea protein is an alternative to gluten with few ailments, unlike milk proteins or soy proteins, which may contain phytoestrogens. It limits the risks of intolerance. Several varieties of peas can be used.

In addition, several varieties of tropical bean can be used, namely the varieties such as Lablab™ and the *niger*. L species, or also Lablab™ *Purpureus*. L, *Dolichos lablab* L, *Dolichos purpeus*. L.

The *Lablab purpureus* L variety is preferred because it provides good results. Advantageously, the role of the pea protein-type homogenizing agent is to homogenize the internal part of the gluten-free baked product. The latter being obtained after baking the baking dough according to the invention, which is in turn obtained from the dough composition transformed into baking dough upon the implementation of the method according to the invention.

The thickening agent is an ingredient that permits to obtain elasticity of the dough, and softness on the baked product obtained from the baking dough according to the invention. In the case of bread or other pastry or Viennese pastry, the thickening agent permits to obtain a developed crumb. A gelling agent can be used. For example, the thickening agent can be or comprise xanthan gum. Other thickening agents that can be used alternately or in combination are guar gum and/or carob bean gum. Xanthan gum is preferred because it provides good results in terms of dough texture and specific bread volume to be achieved.

According to the invention, the dough is kneaded under carbon dioxide pressure, in particular after depressurization of the kneader. Thus, the step of kneading of the dough composition in order to obtain said baking dough is carried out in a controlled environment, under vacuum at the beginning and in which CO2 is subsequently added at a pressure between 25 and 550 mbar for 10 to 50 min. More particularly, the step of kneading is carried out at a CO2 pressure between 25 and 550 mbar, until obtaining a baking dough with a porosity higher than 17% and comprising between 40 and 65 weight % water for between 29 and 52 weight % gluten-free or low-gluten flour. At the end of the kneading, the dough can optionally be left to rise, and then baked to have gluten-free or low-gluten bread or another pastry or Viennese pastry.

The step of injecting CO2 into the previously depressurized chamber, simultaneously with the kneading step, permits to increase the porosity of the baking dough. These two steps, carried out simultaneously, permit to have a very airy dough, already risen and sufficiently inflated to immediately carry out the baking.

At the same time, the intrinsic formulation of the dough composition and the simultaneous steps of kneading and of injecting CO2 result into obtaining a food-quality baking dough having sufficient physicochemical characteristics to be directly placed in the oven for baking, while omitting a usual resting time for fermentation.

These aspects permit to have a dough that is easier to be kneaded in comparison, for example, with a substantially solid bread dough.

As regards specifically the porosity, bread is assimilated to a solid foam, the most important structural characteristic of which according to Gibson and Ashby is its relative density. It permits to create the link between density and mechanical properties of a porous structure (Zghal, Scanlon, & Sapirstein, 2002). It is calculated as follows:

$$p = p^*/ps$$

where $p^*$ is the density of the foam (kg·m−3); and
ps is the density (kg·m−3) of the solid fraction, which the foam is comprised of.

The porosity (without unit) is then defined as being the quantity of pores present in the volume of this foam, calculated by the formula:

$$\text{Porosity} = (1-p^*)/ps.$$

Thus, the volume fraction and the quality of connection of the cells determine not only the structure and aspect of the crumb, but also the specific volume of the bread. The specific volume is the most common size for characterizing the aeration of a bread. The specific volume represents the inverse of the density and is expressed in m3 kg−1

$$v = \frac{V}{m} = p - 1$$

where V (m3) is the volume of the bread
and m (kg) is the weight of the bread

The porosity can be determined using a porosity sensor having a probe in the kneader. Alternatively, a dough sample can be placed in a foldable chamber such as a plastic bag in order to determine its change in volume after flattening.

The porosity can be measured outside the kneader. In this case, at atmospheric pressure, the porosity increases quickly.

During kneading, the CO2 would, according to the first estimates, be dissolved in the dough. It is possible to contemplate to carry out a calibration in order to determine the quantity of CO2 dissolved in the dough during kneading.

Advantageously, the method according to the invention associated with the dough composition permits to significantly increase its porosity compared to samples at similar air pressure. Furthermore, the paste being obtained is substantially liquid, in particular recalling the texture of a chocolate mousse. Until now, the prior art provided to bring the yeasts into the presence of a fermentation reaction reagent (O2). It would seem that putting the yeasts in the presence of the fermentation reaction product (CO2) for about 10 to 30 minutes makes them much more active, so that they then produce a lot of CO2 and significantly increase the porosity.

In addition and surprisingly, the inventors have found that the dough being obtained could advantageously be placed in the oven quickly after kneading, which permits to avoid a fermentation period of time and therefore to limit costs while increasing productivity.

Furthermore, in the case of a bread dough, the inventors have surprisingly found that the bread being obtained has a shelf life of 4 to 6 days with a cohesive crumb without any need to add chemical improving agents such as CMC. Thus, this aspect denotes a significant improvement in quality by providing a gluten-free or low-gluten bread, in particular single-flour gluten-free bread, having a long shelf life without hardening and becoming stale too quickly.

Commercially available multi-flour breads and compositions generally incorporate, in addition to several sources of flour, chemical improvers in order to increase the shelf life of the bread without quickly becoming stale. The invention permits, on the one hand, to have a single-flour bread in order to promote a source of flour and to thus limit production costs and time, and on the other hand, to have significant efficiency in the preservation of bread without chemical improvers.

According to one variant, the method comprises a step of monitoring the porosity of the dough. This advantageously permits to determine, in a first way, accurately in which stage the kneading is, and when it can be considered as being finished.

Porosity is therefore a good indicator for monitoring kneading. Alternatively, it is possible to consider that for a composition, a CO2 pressure and a determined kneading, the target porosity is obtained after a kneading time in a reproducible way.

Preferably, the injected carbon dioxide pressure is higher than 30 mbar, for example 50 to 600 mbar. Tests at 500 mbar provide very good results. The tests show that the higher the pressure, the higher the porosity.

Preferably, the kneading is carried out until a pH of less than 5.5 is obtained. In particular, the pH stabilizes between 5 and 5.4.

Thus, according to one variant, the method comprises a step of monitoring the pH of the dough. This advantageously permits to determine, in a second way, accurately in which stage the kneading is, and when it can be considered to be finished. The pH is therefore a good indicator for monitoring the kneading. The pH can be monitored by taking dough samples to measure the pH. Alternatively, it is possible to consider using a pH measuring device, namely a pH probe in the kneader. Alternatively, it is possible to consider that for a composition, a CO2 pressure and a determined kneading, the target pH is obtained after a kneading time in a reproducible manner.

The inventors have surprisingly found that the injection of $CO_2$ at 500 mbar permits to reduce the kneading time. This implies advantages in terms of productivity. Tests have permitted to determine an optimal kneading time of 30 minutes with 500 mbar of $CO_2$ (POD500), against 60 minutes with a sample at atmospheric pressure, namely 30 mbar (PAC30).

The invention relates in addition to the baking dough being obtained, and the product being obtained, for example gluten-free bread.

The invention will now be described in detail based on non-restrictive examples showing the various innovative aspects.

Example 1

A sample according to the prior art can be prepared based on the amounts described in patent FR 3,029,742 B1, i.e. comprising:
between 88.5 and 95% dictame starch,
between 0.1 and 0.5% salt,
between 1.5 and 4% pea protein,
between 3 and 5% sugar, and
between 0.2 and 3.6% thickening agent.

Example 1 corresponds to an average of the values set out in patent FR 3,029,742 B1 by the same inventor.

To this composition is added between 300 and 640 g water. This sample comprises in particular between 3.5 and 6.5 times more water by weight compared to the amount of starch.

Example 2

Based on a sample according to Example 1, a so-called control sample according to the invention is also prepared, but with 49.07% dictame starch, 43.64 weight % water.

Example 2 corresponds to a composition standard for baking dough, here for making gluten-free bread.

Examples 3 to 6

Examples 3 to 6 correspond to compositions according to Example 2, but with respectively 10, 20, 30 and 40% less dry matter, we can also speak respectively of samples 10, 20, 30 and 40.

The reference of Examples 3 to 6 is taken on the amount of dictame starch reduced by the corresponding percentage, and then amounts of the other dry ingredients were reported in the same way.

The ingredients of the dough are placed in a kneader with a pressurized chamber, such as a commercially available kneader. According to the invention, this kneader is associated with a $CO_2$ injection source, in order to introduce a quantity of it into the kneader during kneading. The source can be a bottle of $CO_2$ associated with a regulator. The bottle mainly contains $CO_2$, for example more than 60%. The tests were carried out with a bottle of $CO_2$ at 99%.

In particular, the chamber is first of all depressurized, then $CO_2$ is introduced into the chamber. The $CO_2$ pressure is preferably a pressure between 25 and 550 mbar. This pressure induces, during the return at atmospheric pressure, an increase in the porosity of the dough, which causes it to swell. Indeed, since the pressure in the chamber is lower than the atmospheric pressure outside the chamber of the kneader, when the baking dough exits the chamber of the kneader, in order to restore the pressure balance, air comprised of $CO_2$, $N_2$ and $O_2$ will enter into the dough and cause it to swell. More particularly, the entering of oxygen into the baking dough upon returning to an atmosphere outside the chamber will cause the dough to swell enough to permit it to be baked directly.

In particular, the water contents of samples 10, 20, 30 and 40 were determined by the so-called AOAC method (1999).

In essence, in this method, an empty container and lid are dried in the oven at 105° C. for 3 h and transferred to a desiccator for cooling. The empty container and lid are then weighed. Then, approximately 3 g of sample are weighed into the container and distributed by means of a spatula. The drying and the desiccation are repeated with, for the case of the desiccation, the container partially covered by the lid. The dried container and sample are then weighed again.

$$\text{Content}(\%) = \frac{(W1 - W2) + 100}{W1}$$

With W1 the weight in grams of the sample before drying; and W2 said weight after drying.

TABLE 1

Water contents of the doughs according to examples 3 to 5 by the AOAC method:

| | Average values | Standard deviations |
|---|---|---|
| 10 | (50-54) | 0.04 |
| 20 | (54-58) | 0.04 |
| 30 | (59-62) | 0.08 |
| 40 | (62-64) | 0.07 |

The above-described samples can therefore be defined by their water content according to the AOAC method, namely a content between 50 and 65%.

Figure 1A:
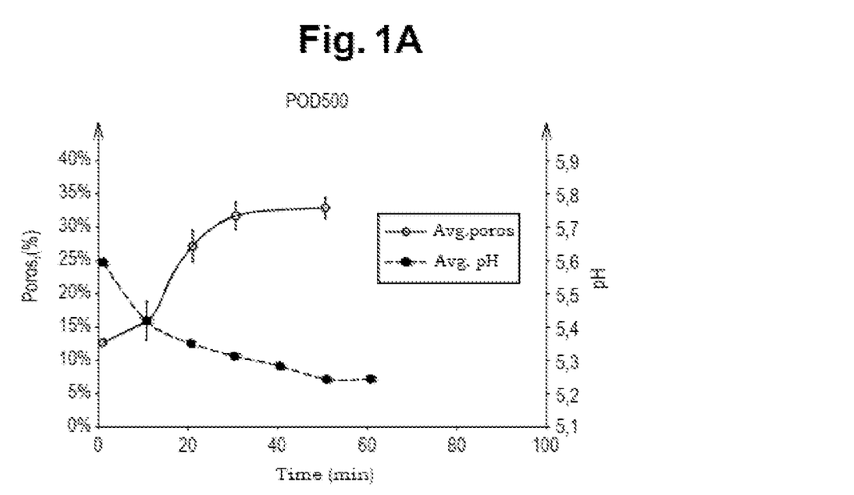
FIG. 1A is a graph of the evolution of the porosity of a baking dough according to the invention (sample POD500) as a function of the time coupled to a graph of the evolution of the pH as a function of the time during kneading.
Figure 1B:
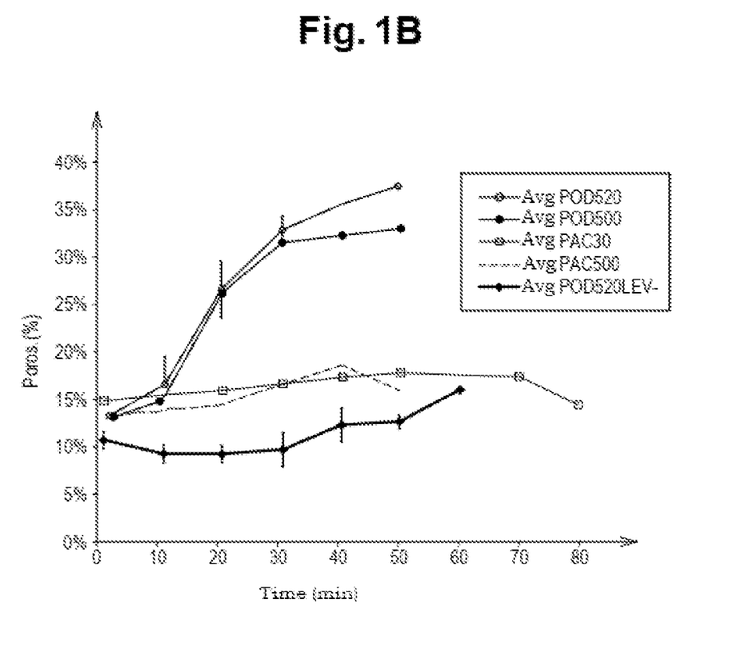
FIG. 1B is a graph of the comparative evolution of the porosity of cooking doughs according to the invention in different configurations of injection of $CO_2$ and other cooking doughs with air injection.

FIGS. 1A and 1B show the evolution of the porosity of samples according to the invention with a pressure of 500 mbar of $CO_2$ injected during the method for manufacturing the baking dough (POD500), samples 20 (POD 520) as well as samples with an atmospheric pressure, i.e. 30 mbar (PAC30) and an air pressure of 500 mbar (PAC500). A 20 type sample without yeast in said initial dough composition (POD520Lev−) is also tested.

As can be seen in FIGS. 1A and 1B, the kneading of the dough composition at atmospheric pressure and at air pressure at 500 mbar generates a significantly lower porosity than that obtained at rapidly increasing $CO_2$ pressure.

The sample of baking dough without yeast has a low porosity, which demonstrates, on the one hand, that the yeasts have their importance in increasing the porosity. On the other hand, there is no gas pressure effect. $CO_2$ alone does not permit a significant increase in porosity. On the contrary, the $CO_2$ acts in synergy with the yeasts right from the kneading, in order to increase the porosity, which exceeds 30%.

Figure 1C:
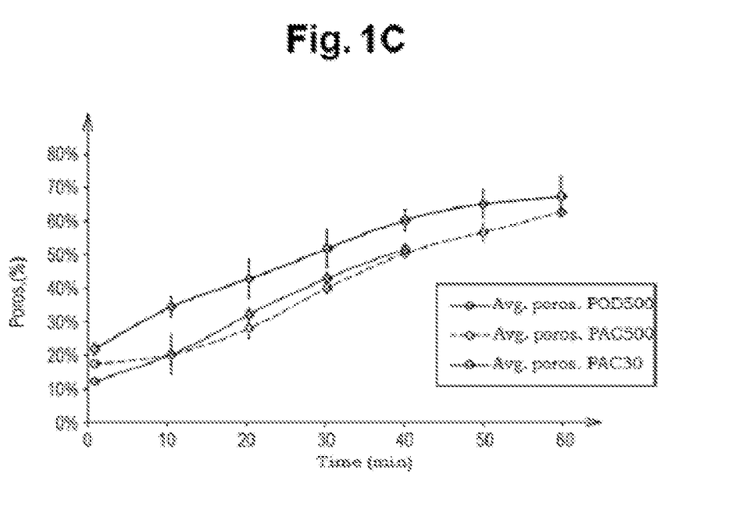
FIG. 1C is a graph of the comparative evolution of the porosity of a baking dough according to the invention kneaded at 500 mbar of $CO_2$ (POD500), and other baking doughs kneaded at 30 mbar (PAC30) and 500 mbar of air (PACSO0), during fermentation.

This aspect is confirmed by the change in porosity during fermentation (optional), in particular shown in FIG. 1C. As can be seen in this figure, the porosity of the sample POD500 remains significantly higher than that of the samples PAC500 and PAC30. This figure shows that there is little effect from the kneading pressure on the fermentation profile.

Thus, the method can be optimized by monitoring the porosity. In particular, it can be considered that when the porosity is above 17%, more particularly above 25%, even 30%, the kneading of the dough composition is successful. The baking dough then has sufficient porosity to be baked.

FIG. 1C shows that in order to reach a desired porosity of the baking dough, ready to be placed in the oven, the method according to the invention permits to significantly reduce the preparation time compared to the samples PAC500 and PAC30 for which the kneading of the dough composition was performed with air injection. In the tests, this time could be reduced by 30%. In other words, for the same initial dough composition, an adequate porosity of the baking dough could be obtained more quickly by simultaneously injecting $CO_2$ during the kneading than by injecting air during the kneading.

Thus, in order to obtain a baking dough with an adequate porosity, i.e. permitting to obtain, after baking, a food product having organoleptic and physicochemical qualities similar to a product containing gluten, the method for manufacturing the baking dough of the invention, combining an intrinsic composition of specific baking dough and a kneading step simultaneously with the injection of $CO_2$ under pressure, is recommended.

Figure 1D:
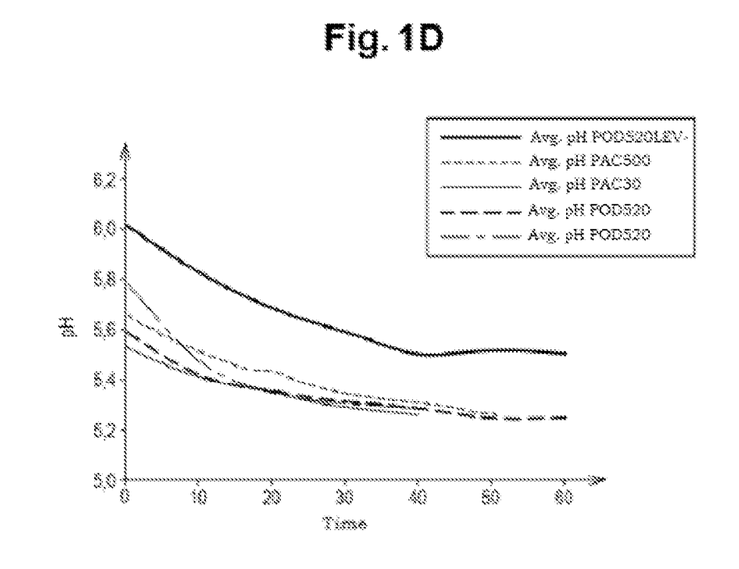

In addition to monitoring the porosity, the method can be carried out by monitoring the evolution of the pH. FIG. 1D shows the change in pH during kneading (time in minutes) for samples of POD520LEV-, PAC500, PAC30, POD500 and POD520. The sample POD520LEV- has a pH that changes from a value higher than 6 to a value of 5.5 after 40 minutes. The pH of the other samples are much lower and reach a value between 5.25 and 5.30. This figure shows that in the absence of yeast, the dough is significantly less acidic.

In addition, the pH of 5.25±0.02 seems to be a signature of the activity of yeasts and their production of $CO_2$, in particular in the amount of yeast being added (here 0.89%) compared to the flour. The $CO_2$ produced by the yeasts lowers the pH by approximately 0.3 units, in particular in the contents of the example. This confirms that the pH is a good indicator for the monitoring of the quality of kneading of the dough according to the invention.

In particular, it can be considered that when the pH is at a value below 5.5, more particularly below 5.3 or even 5.25, the kneading is successful.

Once the dough has risen, optionally after fermentation, it can be placed in the oven to obtain the gluten-free or low-gluten food product, for example gluten-free bread. In particular, said gluten-free or low-gluten baking dough is baked with a porosity higher than or equal to approximately 30% by volume relative to the total volume of said baking dough, for 30 to 60 minutes, at a temperature between 170 and 240° C. Preferably, the baking dough is placed in the oven directly after kneading, because it has reached sufficient porosity, and still swells during baking. This aspect advantageously permits to greatly improve the productivity of the production of products resulting from the dough according to the invention. Indeed, with the implementation of the method according to the invention, in the production of the gluten-free or low-gluten food product, the resting time for fermentation is eliminated. In an industrial process, it is possible to carry out the kneading step followed by the baking step, thereby saving time, which increases the production yield over a determined period.

Figure 2:
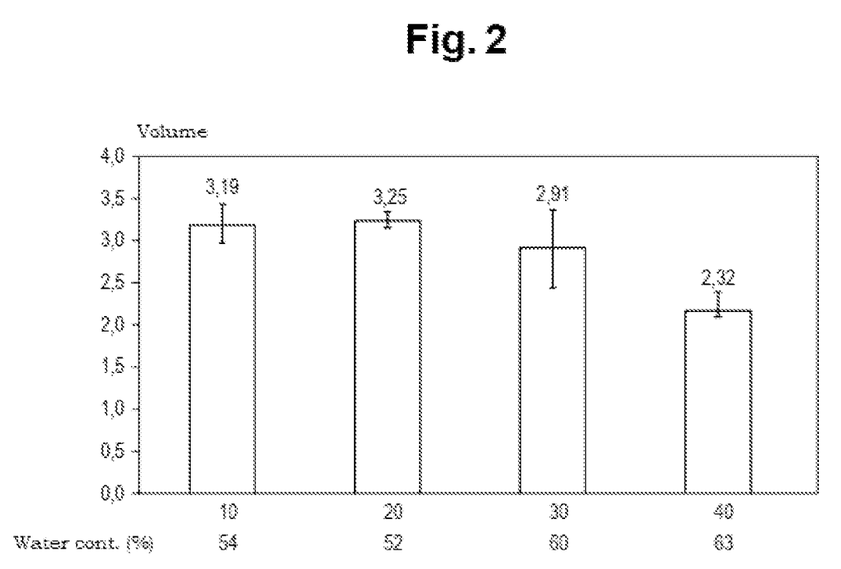
FIG. 2 is a graph of the evolution of the volume of the baked bread in cm3/g as a function of the amount of starch during the rising of the baking dough.

The inventors have surprisingly found that despite the reduced contents of flour, i.e. of dictame starch, compared to water, in comparison with conventional bread doughs, the baking doughs according to the invention permit to obtain significantly large volumes of bread after baking. FIG. 2 shows the change in the volume of the baked bread as a function of the quantity of starch removed (samples 10, 20, 30 and 40). The volumes are expressed in cm3/g. As can be seen in FIG. 2, the samples 10, 20 and 30 have the largest volumes despite the fact that dry matter was removed in the initial dough composition. On average, sample 20 has the largest volume. Thus, the invention relates in addition to a gluten-free or low-gluten baking composition comprising 54 to 60% water, preferably approximately 57% water and between 29 and 47 weight % low-gluten flour, such as dictame starch. Classic wheat-based sandwich breads have a volume ranging from 3 to 5 cm3/g for some American sandwich breads.

Gluten-free breads, according to the method of patent FR 3,029,742 B1, have a volume close to those of the present invention, i.e. approximately 3.2 cm3/g.

The gain in the present invention would be more in limiting the mobility of water, which is slowed down, as well as through reducing the content of downgraded amylopectin over time.

This aspect will be discussed below.

Downgraded amylopectin is indeed very sensitive to the mobility of water and is directly linked to the firming of bread. Indeed, during the baking time, the water, which was previously bound to other molecules, will be trapped by recrystallized amylopectin, this phenomenon of "downgrading of amylopectin" increases the rigidity of the bread. This phenomenon is reduced with the method according the invention.

Once the baking dough was baked, the inventors observed that it had an astonishing shelf life, even though its composition did not include an improver such as CMC. However, improving agents such as CMC are generally included in commercially available gluten-free flours in order to overcome the phenomenon of rigidity of the bread as a consequence of the "downgrading of amylopectin", which may occur during baking, then during storage of the bread.

Figure 3A:
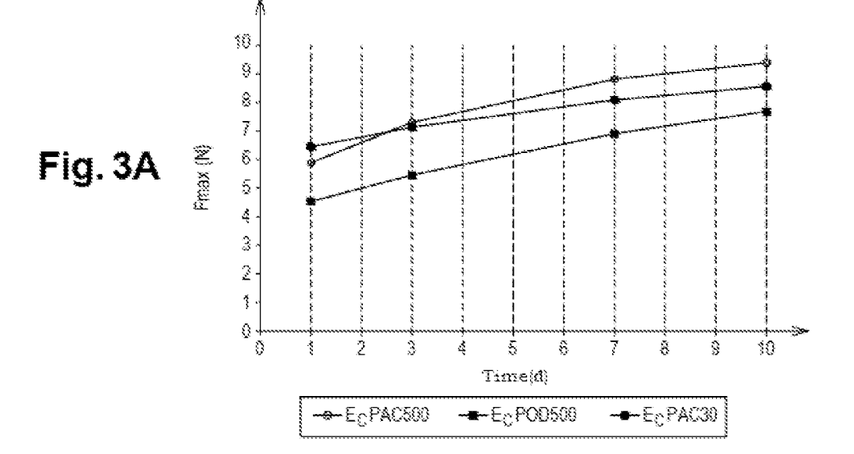
FIG. 3A is a graph, in modeling according to the Avrami equation index n=1, of the evolution of the texture of products, here breads, resulting from baking dough according to the samples POD500, PAC500 and PAC30 as a function of the time.

FIG. 3A shows the evolution of the texture of a baked food product obtained with different baking doughs resulting from the method according to the invention. The texture is determined by modeling according to Avrami.

In essence, the method determines a force to be applied to achieve 40% deformation of the product. The less the force Fmax, the less the bread has a firm texture. As can be seen in FIG. 3A, the sample POD500 maintains a much softer texture than the samples PAC500 and PAC30 for 10 days.

The method for manufacturing a gluten-free or low-gluten food product according to the invention, which combines the use of a specific dough composition with the use of a kneading step simultaneously with an injection of $CO_2$ into a previously depressurized chamber, therefore permits to obtain samples, which maintain their flexibility for 10 days, compared to samples the kneading of which occurred simultaneously with an injection of air.

According to FIG. 3A, the texture of the sample POD500 after 7 days of storage is comparable to the texture of the sample PAC500 after 1 day of storage.

Thus:

for an equivalent dough composition, an equivalent method for manufacturing the food product such as bread, but a method for manufacturing the baking dough that is different as regards the nature of the gas injected during kneading, we obtain a completely different preservation of the properties of the bread texture over time.

Indeed, with the injection of $CO_2$ in replacement of the injection of air, at equivalent pressure, during kneading, a POD500 bread kneaded with $CO_2$ injection will maintain its initial texture 7 times longer than a PAC500 kneaded bread with air injection.

After 7 days, the texture of the sample POD500 is comparable to that of the sample PAC500 after one day, and better than that of the sample PAC30 after one day.

Figure 3B:
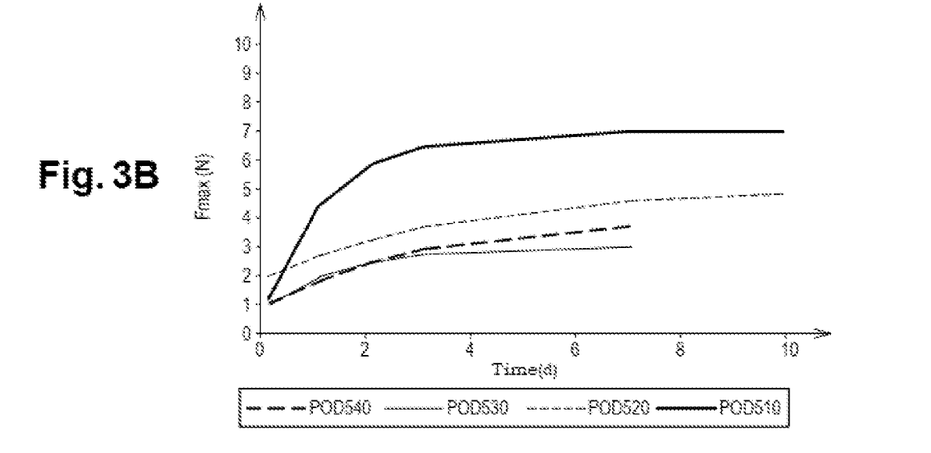
FIG. 3B is a graph, in modeling according to the Avrami equation, of the comparative evolution of the texture of products, here breads, resulting from baking doughs according to the invention in different configurations of injection of $CO_2$.

The same tests were performed with the different samples. FIG. 3B likewise shows, in modeling according to Avrami, the comparative evolution of the texture of the products, here breads, resulting from the samples POD510, POD520, POD530 and POD540.

The sample POD510 has a slightly improved texture compared to the sample POD500, the other ones are significantly better. Even after 10 days, the texture of the samples POD520, POD530 and POD540 remains much better than that of the samples PAC500 and PAC30 after one day.

TABLE 2

Values of the evolution of the textures of the samples in modeling according to Avrami:

| | Pr | PAC30 | PAC500 | POD500 | POD510 | POD520 | POD530 | POD540 |
|---|---|---|---|---|---|---|---|---|
| E oo | 8 | 9.50 | 10 | 10 | 7 | 5 | 3 | 4 |
| WCon (ζ) | 1.9 | 8 | 5 | 11 | 1.2 | 3.60 | 1.5 | 3 |

Figure 4:
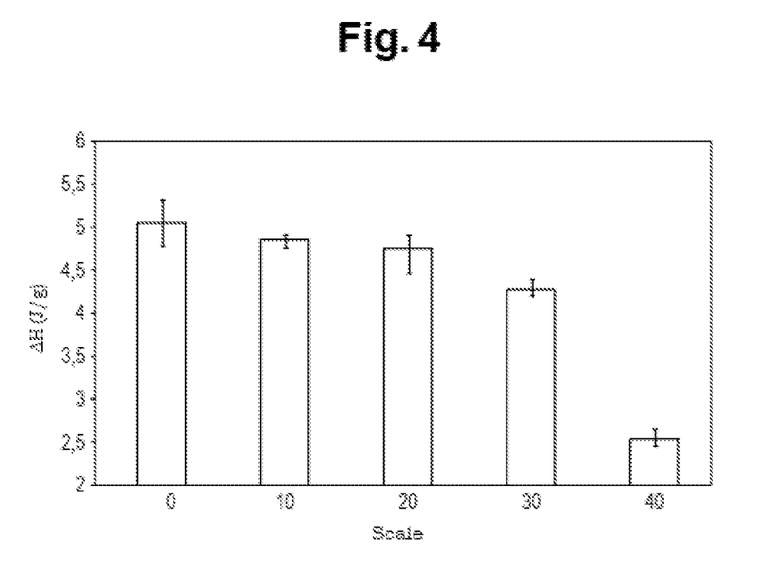
FIG. 4 is a graph of the downgrading of amylopectin as a function of the amount of starch removed from the baking dough.

According to the first observations, the deterioration of the texture is linked to phenomena of crystallization of amylopectin, which lead to staleness. This has been confirmed by a study of the downgrading of amylopectin in the different samples. FIG. 4 shows this downgrading to $\Delta H$ of downgraded amylopectin (namely in J/g of starch). As can be seen in FIG. 4, samples 10, 20, 30 and 40 have very little downgrading of amylopectin compared to the control sample (0), which explains their preserved texture.

The evolution of the texture and the monitoring of the aging can also be determined by determining the contents of free water and bound water (not shown). In the case of a sample PAC30, the evolution of free water ($\Delta H$ in J/g of dry matter) oscillates between 0.60 and 0.63, while that of bound water oscillates between 0.35 and 0.45 for 10 days. In the case of a sample PAC500, the evolution of free water oscillates between 0, 60 and 0.67, while that of bound water oscillates between 0.23 and 0.43 for 10 days. On the contrary, in the case of a sample POD500, the evolution of free water oscillating between 0.57 and 0.62 for 4 days sharply drops to 0.47 on the seventh day. Furthermore, that of bound water oscillating between 0.40 and 0.49 for 4 days sharply rises to 0.70 on the seventh day. This is because free water is trapped in the double helices of amylopectin during their recrystallization and therefore becomes bound to the matter.

Thus, the method for manufacturing baking dough according to the invention permits to further improve the physicochemical properties of a gluten-free or low-gluten food product so that they can be assimilated to the food product with gluten.

In addition, the method for manufacturing a baking dough according to the invention permits to increase the productivity of a food product resulting from said baking dough by permitting to be able to omit the step of resting necessary for the fermentation process before baking.

Performing the kneading of the dough composition, simultaneously with an injection of $CO_2$, in a previously depressurized closed kneader, associated with the use of a specific formulation of the dough composition, permits to obtain a food-quality gluten-free or low-gluten baking dough having adequate physicochemical properties, which, even when omitting the resting time for fermentation, permits to obtain, after baking, a food product:

with a good preservation with a good texture with a volume comparable to those of a conventional product containing gluten.

We claim:

1. A method for manufacturing food-quality baking dough, the method comprising the steps of:

making a dough composition comprising by weight relative to total weight percent: between 88.5 and 95% *Maranta arundinacea*, between 0.1 and 0.5% salt, between 40 and 65% water, yeasts, between 3 and 5% sugar, between 1.5 and 4% pea protein, and between 0.2 and 3.6% of at least one thickening agent;

placing said dough composition in a depressurized closed chamber; and kneading said dough composition in the chamber simultaneously with injecting carbon dioxide at a pressure between 25 and 550 mbar, for 10 to 50 minutes into the chamber so as to obtain a baking dough with only trace amounts of gluten.

2. The method for manufacturing, according to claim 1, wherein said at least one thickening agent is comprised of one of group consisting of: xanthan gum; xanthum gum and guar gum; xantham gum and carob bean gum; and xanthum gum, guar gum and carob bean gum.

3. The method for manufacturing, according to claim 1, wherein the chamber is temperature-controlled at 30° C.

4. The method for manufacturing, according to claim 1, wherein said baking dough has a pH between 5 and 5.4 and a porosity between 28 and 32%.

5. The method for manufacturing, according to claim 1, further comprising the steps of:

baking said baking dough, immediately after the step of kneading said dough composition in the chamber simultaneous with injecting, for 30 to 60 minutes at a temperature between 170 and 240° C.

* * * * *